Oct. 15, 1935. H. S. GENUNG Re. 19,721

ADJUSTABLE AUTO ARMREST

Original Filed May 10, 1930

H. S. Genung
Inventor

By C. A. Snow & Co.
Attorneys.

Reissued Oct. 15, 1935

Re. 19,721

UNITED STATES PATENT OFFICE 19,721

ADJUSTABLE AUTO ARMREST

Harrington Solon Genung, Minneapolis, Minn.

Original No. 1,892,048, dated December 27, 1932, Serial No. 451,477, May 10, 1930. Application for reissue March 21, 1934, Serial No. 716,683

2 Claims. (Cl. 155—198)

This invention relates to an auxiliary arm rest designed for use in connection with motor vehicles, the primary object of the invention being to provide an arm rest for the convenience of the occupants of the car, when the car windows are closed.

An important object of the invention is to provide an arm rest of this character which may be adjusted to various angles, means being provided for securing the arm rest in its positions of adjustment.

A still further object of the invention is to provide an arm rest which may be readily and easily secured in position on the door of a car, eliminating the necessity in making extensive alterations in the construction of the car to position the arm rest.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
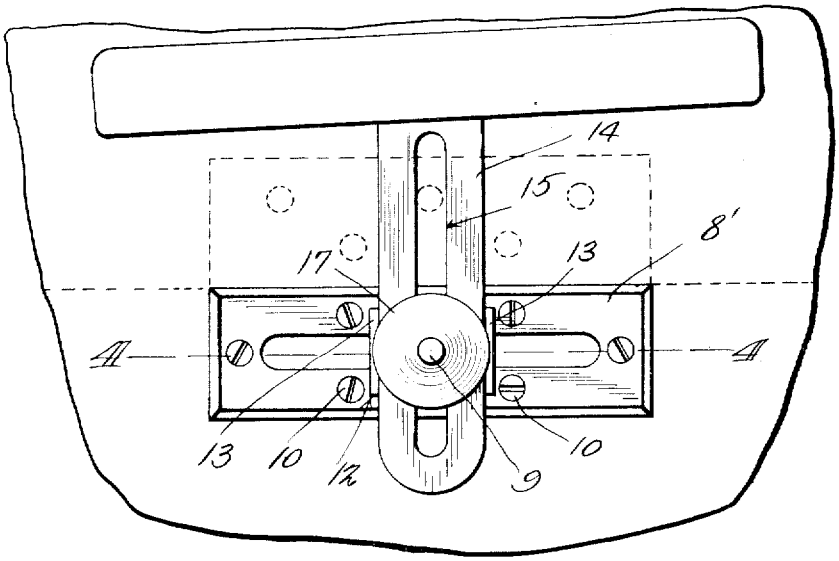
Figure 1 is an elevational view of an arm rest constructed in accordance with the invention.

Referring to the drawing in detail, the arm rest comprises a supporting plate indicated generally by the reference character 5, the same being provided with openings to receive the securing screws 6, whereby the supporting plate is secured to the wooden frame work of the door.

Figure 3:
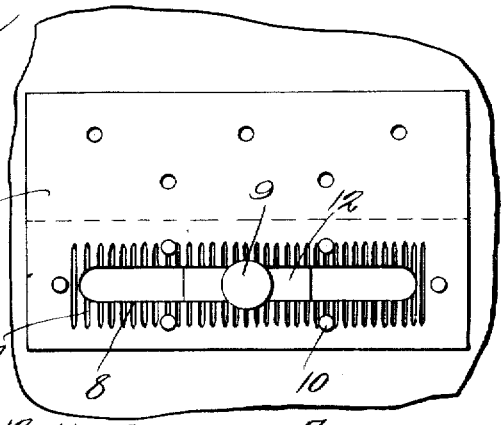
Figure 3 is an elevational view illustrating the rear surface of the supporting plate of the arm rest.
Figure 4:
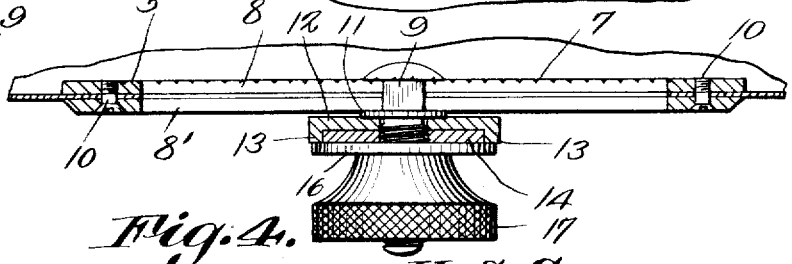
Figure 4 is a sectional view taken on the line 4—4 of Figure 1.

As clearly shown in Figure 3 of the drawing, the rear surface of the plate 5 is formed with serrations 7, the serrations being formed adjacent to the elongated opening 8, in which opening the bolt 9 moves, the bolt 9 being provided with a roughened portion to cooperate with the serrations in holding the bolt 9 in its positions of adjustment.

Figure 2:
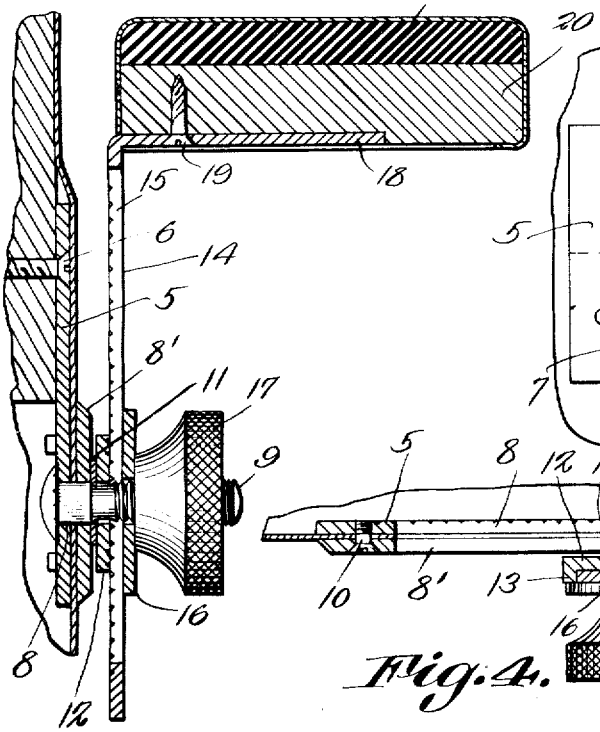
Figure 2 is a vertical sectional view through the arm rest.

A finishing plate indicated by the reference character 8′ is positioned on the supporting plate 5, and is provided with an elongated horizontal opening registering with the elongated opening 8 in the supporting plate 5, to receive the bolt 9. These plates 5 and 8′ clamp the upholstering material in a manner as shown by Figure 2. Screws 10 extend through the finishing plate and supporting plate 5, to secure the finishing plate to the supporting plate, it being understood that the upholstering cloth or covering on the inner surface of the door, is caught between the finishing plate and supporting plate, to give a finished appearance.

Positioned on the bolt 9, is a washer 11 which is disposed on the bolt at a point beyond the threads of the bolt. The reference character 12 designates a plate having upturned ends 13 defining spaced flanges between which the shank 14 of the supporting arm, is positioned. The supporting arm is formed with an elongated opening 15 positioned over the bolt in such a way that vertical movement of the supporting arm will be permitted, so that an adjustment of the supporting arm may be made readily. The rear surface of the shank 14 is roughened to bite into the plate 12.

A washer 16 is positioned on the bolt, and is engaged by the knurled nut 17 which may be operated to set up a binding action between the plate 12, shank 14 and washer 16, to hold the supporting arm in its positions of adjustment. The supporting arm also includes a substantially wide plate 18 formed integral with the shank 14, and extended at right angles to the shank, the plate 18 being provided with openings to receive securing screws 19 for securing the plate to the block 20 of the arm rest, the block 20 being supplied with a cushioning member 21, secured to the upper surface thereof. From the foregoing it will be obvious that due to this construction, the arm rest may be swung forwardly when the door equipped with the arm rest is opened to facilitate getting out and into the car. This may be done without loosening the arm rest, as the serrations of the shank 14 hold the arm rest in place and prevent it from sliding or moving downwardly when it is being tilted forwardly.

It might be further stated that the device may be secured to a bar which is designed to be attached to an all metal door.

It will of course be understood that the block 20 and cushioning member 21 are covered with material to match the cloth with which the car is upholstered. It will also be noted that due to the construction shown and described the arm rest may be adjusted to various angles for the convenience of the occupants of the car.

What I claim is:—

1. An arm rest for vehicle doors covered with upholstering material comprising in combination a supporting plate having an elongated horizontally disposed opening formed therein, said supporting plate adapted to be secured to a door under the upholstery material, a finishing plate secured to the supporting plate to clamp the upholstering material therebetween, said finishing plate having an elongated opening registering with the opening in the supporting plate, a plate having outwardly extended parallel end portions, adjustably mounted on the supporting plate, a shank having an elongated opening and disposed at an angle to the opening of the supporting plate, said shank being held between the outwardly extended parallel end portions to prevent rotative movement of the shank with respect to the last mentioned plate, a bolt extending through the plates and elongated opening of the shank to adjustably secure the shank to the plates, and a padded block secured to one end of the shank.

2. An arm rest for vehicle doors comprising in combination a supporting plate, having an elongated horizontally disposed opening formed therein, said supporting plate adapted to be secured to a door, a plate having laterally extended parallel end portions and an opening therethrough, a shank having an elongated opening and disposed between the parallel end portions of the second named plate and at an angle to the opening in the supporting plate, means extending through the openings of the plates and of the shank to adjustably clamp the shank to the plates and an arm support secured to one end of the shank.

HARRINGTON SOLON GENUNG.